US012807871B2

(12) United States Patent
Harvey

(10) Patent No.: US 12,807,871 B2
(45) Date of Patent: Nov. 24, 2026

(54) SOIL STABILIZING COMPOSITION

(71) Applicant: OFB Corporation PTY LTD, Bracken Ridge (AU)

(72) Inventor: Michael Harvey, Murrumba Downs (AU)

(73) Assignee: OFB Corporation Pty Ltd, Bracken Ridge (AU)

( * ) Notice: Subject to any disclaimer, the term of this patent is extended or adjusted under 35 U.S.C. 154(b) by 498 days.

(21) Appl. No.: 18/575,064

(22) PCT Filed: Jul. 1, 2022

(86) PCT No.: PCT/AU2022/050689
§ 371 (c)(1),
(2) Date: Dec. 28, 2023

(87) PCT Pub. No.: WO2023/272361
PCT Pub. Date: Jan. 5, 2023

(65) Prior Publication Data

US 2024/0301289 A1 Sep. 12, 2024

(30) Foreign Application Priority Data

Jul. 2, 2021 (AU) ................................ 2021902015

(51) Int. Cl.

| | |
|---|---|
| ***C09K 17/50*** | (2006.01) |
| ***C08J 3/24*** | (2006.01) |
| ***C08K 3/22*** | (2006.01) |
| ***C08K 5/09*** | (2006.01) |
| ***C08L 3/12*** | (2006.01) |
| ***C08L 33/08*** | (2006.01) |
| ***C08L 33/26*** | (2006.01) |

(52) U.S. Cl.
CPC ............... *C09K 17/50* (2013.01); *C08J 3/246* (2013.01); *C08K 3/22* (2013.01); *C08K 5/09* (2013.01); *C08L 3/12* (2013.01); *C08L 33/08* (2013.01); *C08L 33/26* (2013.01); *C08K 2003/2206* (2013.01)

(58) Field of Classification Search
CPC . C09K 17/50; C08J 3/246; C08K 3/22; C08K 5/09; C08K 2003/2206; C08L 3/12; C08L 33/08; C08L 33/26
USPC .......................................................... 404/76
See application file for complete search history.

(56) References Cited

U.S. PATENT DOCUMENTS

| | | | | |
|---|---|---|---|---|
| 9,441,332 | B2 * | 9/2016 | Hanley | E01C 3/04 |
| 2017/0030031 | A1 * | 2/2017 | Szafert | E01C 11/005 |

FOREIGN PATENT DOCUMENTS

| | | | | |
|---|---|---|---|---|
| CN | 109824300 A | 5/2019 | | |
| CN | 110527487 A | 12/2019 | | |
| DE | 102014005867 A1 * | 10/2015 | | E01C 3/04 |
| WO | 2018090105 A1 | 5/2018 | | |
| WO | 2019038105 A1 | 2/2019 | | |

OTHER PUBLICATIONS

International Preliminary Report on Patentability for Application No. PCT/AU2022/050689 dated Dec. 14, 2023.

* cited by examiner

*Primary Examiner* — Raymond W Addie
(74) *Attorney, Agent, or Firm* — KDW Firm PLLC

(57) ABSTRACT

A soil stabilizing composition formed from a first part comprising a first polymer that comprises an acrylate monomer and a second polymer that comprises an acrylamide monomer, wherein first polymer and second polymer directly cross-link. The soil stabilizing composition is also formed from a second part comprising polysaccharide and calcium hydroxide. and a simple carboxylic acid. The first part and the second part are mixed in a composition solvent. The soil stabilizing composition is advantageously able to provide stability to a soil substrate.

20 Claims, No Drawings

SOIL STABILIZING COMPOSITION

This application is a national stage application in the U.S. filed under 35 U.S.C. § 371 of pending International Patent Application No. PCT/AU2022/050689 filed 1 Jul. 2022, which claims priority to Australian Patent Application No. 2021902015 filed 2 Jul. 2021, the entireties of which applications are hereby incorporated by reference herein.

FIELD OF THE INVENTION

The present invention relates to the field of construction. More particularly, the invention relates to soil stabilization, specifically for road and pavement construction. Most particularly, the invention relates to an improved soil stabilizing composition.

BACKGROUND TO THE INVENTION

In an earlier related application published as WO2018/090105, the Inventor described a soil stabilizing composition that consisted of a first polymer comprising an acrylamide monomer, a second polymer comprising an acrylate monomer and a solvent, wherein the first polymer and the second polymer directly cross-linked to stabilize a soil substrate.

The background to the application explained that stability of soil can have a significant impact on the lifetime and cost of roads and other similar infrastructure, such as footpaths, bike paths, air strips, etc. Transport infrastructure is an important element in the economy as it facilitates distribution of goods and services. The lifetime and cost of roads and the like impact economic viability. In particular, the composition and characteristic of soil underlying a pavement has a significant impact on the durability of the pavement. Similarly, the durability of unpaved roads, paths, etc, is enhanced by soil stabilization.

In this specification the term "pavement" is used to describe any form of paved surface, but specifically refers to concrete or asphalt roads, airstrips, footpaths, bike paths and the like. The term "soil stabilization" in this specification is used to describe a stabilized soil surface that incorporates a binding agent, whether or not a further paving is placed on the surface.

Soils may be classified by particle size, and range from fine-grained, high expansion clays and silts to large rocks. Dislocation and diminution of particles or of particle agglomerates are the primary cause of deterioration of natural soils and man-made structures placed thereon. As such, the stability of soil can have a significant impact on the lifetime and cost of roads and similar infrastructure.

In order to improve stability, soil can be treated so that it is embedded in a matrix, or confined mechanically, or compacted into an interlocking arrangement that holds the particles together.

It is known to use bonding agents which agglomerate individual soil particles and hold them firmly in place to form cohesive structures. These structures are composed of individual particles which are interlocked mechanically into coherent bodies with a bonding agent so that they resist displacement when exposed to forces such as mechanical abrasion and erosion. These forces can destroy the coherence of bonded structures. Many attempts have been made to create bonding agents that take into account different soil properties. One such attempt was to combine different bonding agents. However, the desired combination of effects could not be achieved by using mixtures of individual components because soils can have a preferential affinity for different compounds.

Other approaches have focused on the use of polymer/monomer blends as aqueous or petroleum dispersions, often in combination with asphaltic mixtures. These blends often require elevated temperatures or have specific constraints on the substrate. Additionally, these materials may also require additional time for curing, or have a severely limited lifespan. Another common problem with these blends is that they can separate into different phases.

By way of example, one attempt to provide additional soil stabilization is described in US Patent Application No. 2014/0169879. This document utilizes co-polymers to provide improved subgrade soil binders. The co-polymer is produced from monomers of acrylamide, sodium acrylate and 3-acrylamido-N,N,N-trimethylpropan-1-aminium chloride. The cationic aminium chloride functional group adsorbs to clays through electrostatic interactions. This copolymer is directed towards soils with high clay content, and is less suited towards soils with lower clay content.

Reference may also be had to international patent publication number WO 1996016141, assigned to Techno Terra Limited. This patent describes a composition used for improving load bearing capacity of soils. The composition comprises a polyvalent cation and a flocculent such as polyacrylamide.

The compositions described above fail to achieve a sufficiently durable soil stabilisation.

SUMMARY OF THE INVENTION

In one form, although it need not be the only or indeed the broadest form, the invention resides in a soil stabilizing composition formed from:

- a first part comprising:
  - a first polymer that comprises an acrylate monomer; and
  - a second polymer that comprises an acrylamide monomer;
  - wherein the first polymer and second polymer directly cross-link;
- a second part comprising:
  - a polysaccharide;
  - calcium hydroxide, and
  - a simple carboxylic acid;
- and a composition solvent.

The first polymer is preferably a styrene-acrylate heteropolymer but may alternatively be an acrylate homopolymer.

The second polymer is preferably a polyacrylamide.

The polysaccharide is preferably a glucose-based polysaccharide and most preferably is amylopectin. Amylopectin and calcium hydroxide are preferably in a mixture in the form of sticky rice mortar. Sticky rice mortar was prepared traditionally by addition of sticky rice to a mortar which comprised slaked lime. Slaked lime is the common name of calcium hydroxide but it will be appreciated that other mortars may contain different basic calcium salts.

Suitably the simple carboxylic acid is a $C_1$-$C_6$ carboxylic acid, and, in particular, is selected from methanoic acid (formic acid), ethanoic acid (acetic acid), propionic acid or butanoic acid.

The composition solvent is preferably a polar solvent, aqueous solvent or is most preferably water.

The first part is preferably formed by mixing the first polymer and the second polymer in a first part solvent, which may suitably be water.

The second part is preferably formed by mixing the polysaccharide and calcium hydroxide with the simple carboxylic acid in a second part solvent, which may suitably be water.

In a further form, although again not the only or indeed the broadest form, the invention resides in a method of stabilizing a soil substrate including the steps of:

providing a soil stabilizing composition comprising:
- a first part comprising:
  - a first polymer that comprises an acrylate monomer; and
  - a second polymer that comprises an acrylamide monomer;
    - wherein the first polymer and second polymer directly cross-link;
- a second part comprising:
  - amylopectin and calcium hydroxide; and
  - simple carboxylic acid;
- and a composition solvent;

treating the soil substrate with the soil stabilizing composition; and curing the soil stabilizing composition.

The method may be applied to soil substrates selected from asphalt grindings, coal dust, concrete grindings, ground glass, crusher dust, recycled bitumen, bull dust, bauxite dust, fly ash, expansive clays, or any combination thereof.

In a further form, although again not the only or indeed the broadest form, the invention resides in a method of stabilizing a soil substrate including the steps of: providing a first part of a soil stabilizing composition comprising: a first polymer that comprises an acrylate monomer; and a second polymer that comprises an acrylamide monomer; wherein the first polymer and second polymer directly cross-link; providing a second part of a soil stabilizing composition comprising: amylopectin, calcium hydroxide; and a simple carboxylic acid; mixing the first part and the second part with a composition solvent; treating the soil substrate with the mixture; and curing the mixture used to treat the soil substrate.

In a further form, although again not the only or indeed the broadest form, the invention resides in a kit for stabilizing a soil substrate comprising: a first part of a soil stabilizing composition comprising: a first polymer that comprises an acrylate monomer; and a second polymer that comprises an acrylamide monomer; wherein the first polymer and second polymer directly cross-link; a second part of a soil stabilizing composition comprising: amylopectin, calcium hydroxide; and a simple carboxylic acid; and instructions for use to stabilize a soil substrate.

In an embodiment, the kit further comprises a composition solvent.

Further features and advantages of the present invention will become apparent from the following detailed description.

DETAILED DESCRIPTION OF THE INVENTION

Embodiments of the present invention reside primarily in a soil stabilizing composition and a method of stabilizing soil using the composition. Accordingly, elements and method steps have been described and illustrated in concise manner, so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

As used herein, the term 'about' means the amount is nominally the number following the term 'about' but the actual amount may vary from this precise number to an unimportant degree.

As used herein, the term 'soil' refers to the surface or ground in which roads and/or infrastructure is built upon, and includes top soil and subsoil. Additionally, the term 'soil' also relates to aggregates which are not limited to natural materials and may include asphalt grindings, coal dust, concrete grindings, ground glass, crusher dust, recycled bitumen and the like.

In a first embodiment, the invention resides in a soil stabilizing composition. The soil stabilizing composition comprises a first part (Part A) and a second part (Part B) mixed in a composition solvent. The composition solvent may be a polar solvent such as water, although other solvents may also be suitable as discussed below.

The first part is a mixture of two polymers in a first part solvent. The first polymer comprises an acrylate monomer and the second polymer comprises an acrylamide monomer. The first polymer and the second polymer are mixed with the first part solvent to form the first part. The first part solvent may be water, but can be some other solvent as mentioned below.

The second part comprises a mixture of a simple carboxylic acid with a polysaccharide, preferably amylopectin, and calcium hydroxide $Ca(OH)_2$ (also known as slaked lime) in a second part solvent. The second part solvent may be water, but can be some other solvent as mentioned below.

The soil stabilizing composition is advantageously able to provide stability to a soil substrate as discussed in more detail hereinafter.

Looking at the first part, in one embodiment the first polymer is a polymer that comprises an acrylate monomer. It will be appreciated that the first polymer may be a polymer produced from multiple monomers, wherein one of the monomers is an acrylate monomer. In this regard, the first polymer may be a homopolymer or a heteropolymer. Other non-limiting examples of monomers that can form part of the first polymer are styrene monomers, vinyl monomers, acetate monomers, ethylene monomers and combinations thereof. As such, the first polymer can be a styrene-acrylate polymer. It will be appreciated that the first polymer may be a non-ionic polymer. In an embodiment, the first polymer is non-ionic styrene-acrylate polymer.

In one embodiment the first polymer has a minimum film forming temperature suitably less than about 10° C., and preferably between about 0° C. and about 10° C.

The first polymer has a glass transition temperature suitably greater than about 0° C., more suitably between about 0° C. and about 25° C., preferably between about 0° C. and about 20° C., more preferably between about 5° C. and about 20° C., and most preferably between about 8° C. and 20° C.

The second polymer is a polymer that comprises an acrylamide monomer. It will be appreciated that the second polymer may be a polymer produced from multiple monomers, wherein one of the monomers is an acrylamide monomer. In this regard, the second polymer may be a homopolymer or a heteropolymer. In one embodiment, the second polymer is polyacrylamide. It will be appreciated that the second polymer may be an ionic polymer. In an embodiment, the second polymer is a cationic polyacrylamide polymer. The second polymer has a molecular weight of between about $1\times10^4$ and about $1\times10^9$ Daltons. It has been found that a molecular weight between about $1\times10^5$ and about $1\times10^8$ Daltons is particularly suitable.

The first part solvent may be any solvent in which the first polymer and second polymer can be dispersed. The first part solvent may be a polar solvent or a non-polar solvent. The first part solvent may suitably be water, an alcohol, a glycol, a glycol ether, an ester alcohol, a ketone or an aprotic solvent. Non-limiting examples of the solvent include water, methanol, ethanol, isopropanol, butanol, pentanol, 2,2,4-trimethyl-1,3-pentanediol monoisobutyrate and N-methyl-2-pyrrolidone. In one preferred embodiment, the first part solvent is water. It will be appreciated that the first part solvent is not limited to pure solvents and can include a blend of one or more solvents. For instance, the solvent may be a mixture of aliphatic alcohols and water.

The first part may be produced as a concentrate and diluted onsite to form a working composition. The amount of diluting solvent required is determined by the amount of dilution required to form the first part having regard to the proportion of polymer to be applied.

In one embodiment, the first part has the first polymer present in an amount of 560 kg per 1000 litres, which is to say 56% solids content. The percentage solids content may be varied from this amount, but as explained below, the percentage of polymer in the final composition is determined by the dilution from a concentrate to a working composition. The second polymer is present in much lower concentration of around 0.05% to 1%.

Looking at the second part, the mixture of amylopectin and $Ca(OH)_2$ is sometimes referred to as sticky rice mortar. The sticky rice mortar may be purchased ready-mixed. Alternatively, the sticky rice mortar may be prepared by mixing 25 parts by weight of amylopectin with 10 parts by weight of calcium hydroxide and 65 parts by weight of a second part solvent, such as water. These proportions have been found to be suitable but may be varied for specific applications by up to about +/−10%.

The acid in the second part is a simple carboxylic acid such as methanoic acid (also known as formic acid), ethanoic acid, propanoic acid or butanoic acid. It has been found that Formic Acid is most suitable. The simple carboxylic acid is added to reduce the pH range to between 6 and 9, thus reducing free alkalinity. Formic acid was chosen as the most suitable simple carboxylic acid because the neutralisation product (calcium formate) has reasonable solubility (around 170 g/L @25° C.) and imparts a number of desirable properties in the final product, e.g. increased hardness and decreased setting time. Its addition is desirable for work at low temperature and for inhibition of corrosion of metal surfaces of field equipment. The alternative inorganic neutralisers (such as hydrochloric or sulphuric acids) lack inhibitory properties. Moreover, solubility of calcium sulphate is poor, leading to processing difficulties, and it is preferable to avoid adding chloride load to minimise environmental concerns.

The second part is prepared by mixing the sticky rice mortar with the simple carboxylic acid for a mixture ratio sufficient to achieve a pH between 6 and 9. In one example, the second part is made in a 1000 litre batch. The amylopectin and calcium hydroxide are mixed with a volume of water. The simple carboxylic acid is then added to adjust the pH to around neutral and water is added to bring the total volume to 1000 litre. In this example the amount of amylopectin in the second part is 25%, but this is not a critical ratio.

In preparing the soil stabilizing composition for use it has been found that it is convenient to mix the first part with the second part in a large volume of composition solvent. This ensures the first and second part remain workable for a reasonable period of time. For instance, one preferred mixing strategy is to mix 3500 litres of Part A with 3500 litres of Part B in a tank of 25000 litres of water. That is to say a proportion of 3.5:3.5:18. This proportion of Part A, Part B and water gives about 4 to 5 hours of working time for the soil stabilizing composition.

It has been found that different composition ratios are appropriate for different applications. By way of example, for a light duty application about 1% amylopectin and about 2.25% resin solids is appropriate. This means a working composition of 1000 litres of the first part and 1000 litres of the second part with the balance of solvent in a 25000 litre tank.

For a heavy duty application about 3% by volume of amylopectin and 6.75% of polymer is appropriate, which means 3000 litres of the first part and 3000 litres of the second part with the balance of solvent in a 25000 litre tank.

For an extra heavy duty application suitable volumes may be 3000 litres of the first part and 5000 litres of the second part with the balance of solvent in a 25000 litre tank, which gives 1% amylopectin and 11.2% polymer.

The three examples mentioned above are set out in the following table. The respective ratios are 1:1:23, 3:3:19 and 3:5:17, but other ratios, such as 1:2:22, may find application in specific circumstances.

| Application | Part A (liters) | Part B (liters) | Water (liters) |
|---|---|---|---|
| Light Duty | 1000 | 1000 | 23000 |
| Heavy Duty | 3000 | 3000 | 19000 |
| Extra Heavy Duty | 3000 | 5000 | 17000 |

It will be appreciated that the amount of composition solvent in the soil stabilizing composition depends on the amount of dilution required. In this regard, the soil stabilizing composition may be provided as a Part A concentrate and a Part B concentrate to be mixed with composition solvent on-site, or as a working soil stabilizing composition where Part A and Part B are pre-mixed with more composition solvent. The concentrate and working composition are stable and easy to handle. In this regard, in one embodiment, the concentrate and working composition are non-corrosive.

Furthermore, it will be appreciated that the amount of composition solvent required is determined by the amount of dilution required to form the working composition for the specific application. Thus, a smaller amount of solvent may be required for a lower volume that may be delivered in a short time as compared to a larger volume that may need to be workable for a longer time.

Although water is the preferred solvent and will be used in the majority of cases, the solvent may be any solvent in which the first part, second part, and composition may be formed. A different solvent may be used for the first part, the second part and the soil stabilizing composition. Each solvent may be a polar solvent or a non-polar solvent. The solvent in each case may be, an alcohol, a glycol, a glycol ether, an ester alcohol, a ketone or an aprotic solvent. Non-limiting examples of the solvent include water, methanol, ethanol, isopropanol, butanol, pentanol, 2,2,4-trimethyl-1,3-pentanediol monoisobutyrate and N-methyl-2-pyrrolidone. In one embodiment, the first part solvent, the second part solvent and the composition solvent are water. It will be appreciated that the solvent in each case is not limited to pure solvents and can include a blend of one or more solvents. For instance, the solvent may be a mixture of aliphatic alcohols and water.

In the earlier published international application mentioned above, a soil stabilizing composition based only on Part A was found to exhibit a significant increase in the California Bearing Ratio (CBR) compared to the untreated aggregate. The CBR is a penetration test for evaluating the mechanical strength of the ground beneath new roads and pavement. CBR measures the pressure required to penetrate the soil or substrate with a plunger of a standard area to a depth of 2.5 mm and 5 mm. The measured pressure is then divided by the pressure required to achieve an equal penetration in a standard crushed rock material. In summary, the higher the CBR the harder the surface. The standard material for this test is crushed California limestone which has a value of 100. The tests showed that by blending the first polymer with the second polymer, it significantly increased (>10%) the CBR above the level of using the second polymer alone. Additionally, there was a significant increase in CBR over a significant range of substrates. This was an unexpected result because, at the levels used, the first polymer on its own displayed no significant increase in CBR compared to the untreated substrate. The increase in CBR in the treated substrate was sufficient for roads and infrastructure to be built thereon, but was still less than ideally desired.

The addition of Part B has further increased the effectiveness of the soil stabilizing composition. The present soil stabilizing composition (based on the mixture of Part A and Part B) offers additional strength and thus lifetime to the soil substrate. This is particularly advantageous to the resultant road or infrastructure built thereon.

The second polymer contains amide and carboxylic acid functional groups and may further react or complex with other components, such as other components of the composition. As such, it is believed that the other functional groups that are compatible in this manner can be used.

Additionally, it is also postulated that, when the first polymer is cationic, the cationic charge causes the first polymer to be attracted to the surface of some soils. Clayeous surfaces typically have negatively charged sites and so the use of a cationic polymer can lead to an electrostatic interaction between the first polymer and the substrate. This promotes better adhesion and agglomeration of light particles such as dust. As such, the soil stabilizing composition can act as a dust suppressant. The improved bonding and lower micro particulate loading provides improved penetration and improved adhesion of the second polymer to the substrate in a stronger ‘bond’ which is less likely to de-lamination from the substrate.

The addition of Part B is speculated to provide additional strength and durability by the amylopectin acting as an inhibitor to control the growth of calcium carbonate crystals and promote the growth of compact microstructures. The compact microstructures work synergistically with the cross-linked polymers to enhance adhesiveness, sturdiness, and water resistance. In particular, the soil stabilizing composition of one embodiment demonstrated no appreciable reduction in effectiveness even after 7 days soaking in water in a test pod.

It is further speculated that composition acts to fill micro-voids in the medium to be bound, minimising “fines” by agglomeration, and extending the usefulness of the composition. The resulting aggregate bond is stronger and uses less polymer than previously required, resulting in a commercial benefit.

The soil stabilizing composition may further comprise additives. The additives can include surface tension modifiers, adhesion promoters, curing agents, stabilizers, colouring agents and preservatives. It will be appreciated by the person skilled in the art that the list provided is not an exhaustive list, but merely exemplify some of the types of additives that can be utilized. These additives provide additional, or alter, characteristics of the soil stabilizing composition and thus the treated soil substrate. The additives are preferably dispersible in the composition solvent, are active at low concentrations and non-toxic.

The curing agent increases the hardness of the substrate. Suitable cross-linking curing agents include aziridines, carbodiimides and metal salts. A non-limiting example of a cross-linking curing agent is zinc ammonium chloride.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A soil stabilizing composition formed from:
a first part comprising:
a first polymer that comprises an acrylate monomer; and
a second polymer that comprises an acrylamide monomer;
wherein the first polymer and second polymer directly cross-link;
a second part comprising:
a polysaccharide,
calcium hydroxide, and
a simple carboxylic acid;
and a composition solvent.

2. The soil stabilizing composition of claim 1, wherein the first polymer is a styrene-acrylate heteropolymer.

3. The soil stabilizing composition of claim 1, wherein the first polymer is a homopolymer.

4. The soil stabilizing composition of claim 1, wherein the second polymer is polyacrylamide.

5. The soil stabilizing composition of claim 1, wherein the polysaccharide is a glucose-based polysaccharide.

6. The soil stabilizing composition of claim 1, wherein the polysaccharide is amylopectin.

7. The soil stabilizing composition of claim 6, wherein the amylopectin and calcium hydroxide are in a mixture in the form of sticky rice mortar.

8. The soil stabilizing composition of claim 1, wherein the simple carboxylic acid is selected the group consisting of:

methanoic acid (formic acid), ethanoic acid (acetic acid), propionic acid, or butanoic acid.

9. The soil stabilizing composition of claim 1, wherein the composition solvent is a polar solvent.

10. The soil stabilizing composition of claim 9, wherein the polar solvent is water.

11. The soil stabilizing composition of claim 1, wherein the first part is formed by mixing the first polymer and the second polymer in a first part solvent.

12. The soil stabilizing composition of claim 11, wherein the first part solvent is water.

13. The soil stabilizing composition of claim 1, wherein the second part is formed by mixing the polysaccharide and calcium hydroxide with the simple carboxylic acid in a second part solvent.

14. The soil stabilizing composition of claim 13, wherein the second part solvent is water.

15. A method of stabilizing a soil substrate including the steps of:

providing a soil stabilizing composition comprising:

a first part comprising:

a first polymer that comprises an acrylate monomer; and a second polymer that comprises an acrylamide monomer;

wherein the first polymer and second polymer directly cross-link;

a second part comprising:

amylopectin;

calcium hydroxide; and a simple carboxylic acid;

and a composition solvent;

treating the soil substrate with the soil stabilizing composition; and curing the soil stabilizing composition.

16. The method of stabilizing a soil substrate according to claim 15, wherein the soil substrate is asphalt grindings, coal dust, concrete grindings, ground glass, crusher dust, recycled bitumen, bull dust, bauxite dust, fly ash, expansive clays, or any combination thereof.

17. A method of stabilizing a soil substrate including the steps of:

providing a first part of a soil stabilizing composition comprising:

a first polymer that comprises an acrylate monomer; and a second polymer that comprises an acrylamide monomer;

wherein the first polymer and second polymer directly cross-link;

providing a second part of a soil stabilizing composition comprising:

amylopectin;

calcium hydroxide; and a simple carboxylic acid;

mixing the first part and the second part with a composition solvent;

treating the soil substrate with the mixture; and curing the mixture used to treat the soil substrate.

18. The method of stabilizing a soil substrate according to claim 17, wherein the soil substrate is asphalt grindings, coal dust, concrete grindings, ground glass, crusher dust, recycled bitumen, bull dust, bauxite dust, fly ash, expansive clays, or any combination thereof.

19. A kit for stabilizing a soil substrate comprising of:

a first part comprising:

a first polymer that comprises an acrylate monomer; and a second polymer that comprises an acrylamide monomer;

wherein the first polymer and second polymer directly cross-link;

a second part comprising:

amylopectin;

calcium hydroxide; and a simple carboxylic acid;

and instructions for use to stabilize a soil substrate.

20. The kit of claim 19, further comprising a composition solvent.

* * * * *